T. A. RICHARDS.
CUTTING AND FACING EMERY WHEELS.
No. 183,468. Patented Oct. 17, 1876.
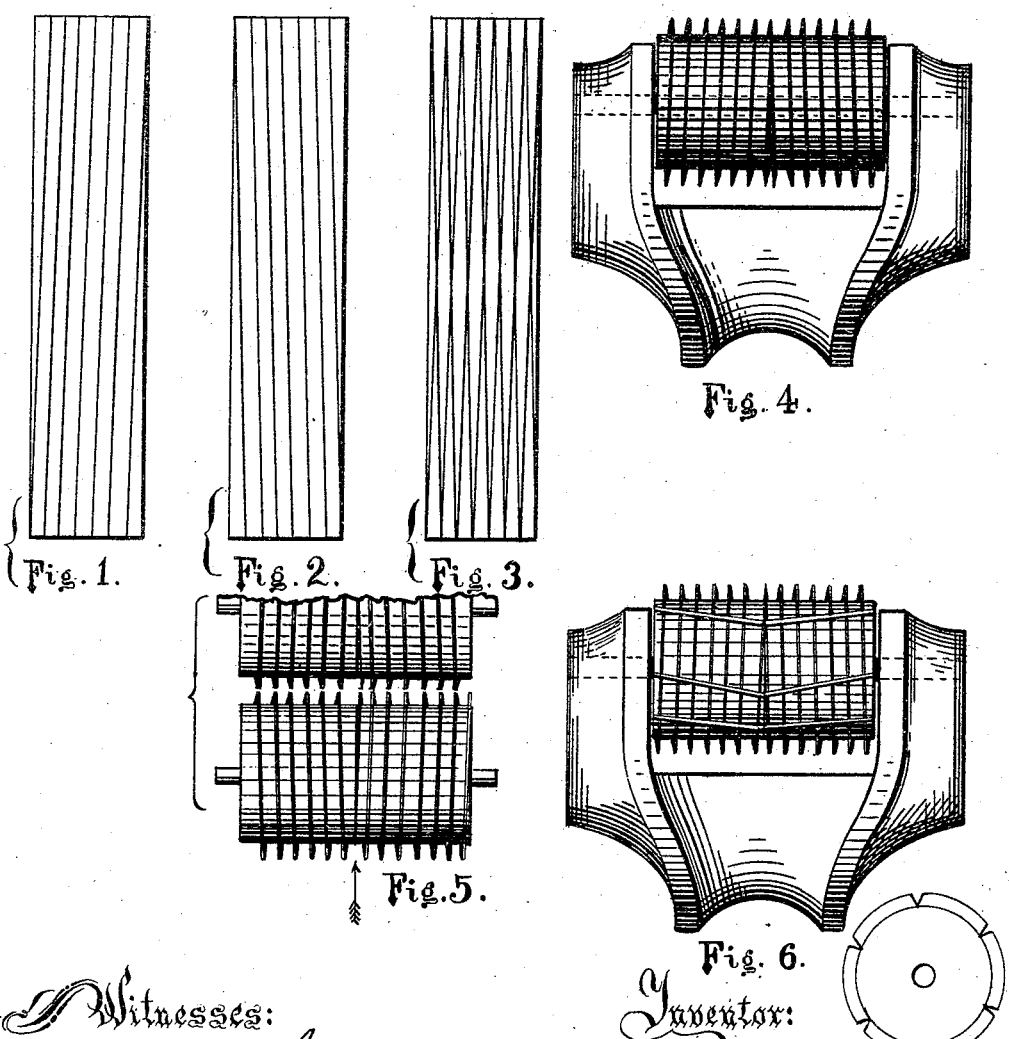

UNITED STATES PATENT OFFICE.

THERON A. RICHARDS, OF BROOKLYN, NEW YORK, ASSIGNOR TO CHARLES H. WIGHT, TRUSTEE, OF SAME PLACE.

IMPROVEMENT IN CUTTING AND FACING EMERY-WHEELS.

Specification forming part of Letters Patent No. 183,468, dated October 17, 1876; application filed August 12, 1876.

*To all whom it may concern:*

Be it known that I, THERON A. RICHARDS, residing in the city of Brooklyn, county of Kings, and State of New York, have invented an improvement in the devices for and art of working, cutting, or facing solid emery-wheels, grindstones, granite, sandstone, marble, slate, and other like material, natural and artificial, which improvement is fully set forth in the following specification, reference being had to the accompanying drawing, where—

Figure 1 shows the cutting-lines made by a right-hand screw-thread cutter. Fig. 2 shows the same made by a left-hand screw-thread cutter. Fig. 3 shows the two combined, or one superimposed upon the other. Fig. 4 shows a right and left hand screw-thread cutter on the same shaft; Fig. 5, the same with duplicate in reverse; and Fig. 6 shows screw-thread or diagonal cutters with reverse diagonal grooves and cutting-edges, on the same roller-cutters.

The object of the invention and the particular art to which it applies are both stated in the title of the invention.

The invention consists in working, cutting, or facing stone, natural or artificial, and other like substances, by means of cutter-rollers, the cutting or operating parts of which are diagonal to the axis of the roller, and also to each other, consisting of screw-threads disposed, as in the ordinary screw, around a cylinder at an angle with the cylinder-axis, and operating, first, with a right or left hand cut, or, second, with a right or left hand cut superimposed upon the other alternately, or immediately cylindrical; or roller-cutters having the operating or cutting edges disposed around the cylinder or roller in planes at right angles to the cylinder-axis have been tried for cutting stone. When rolled or rotated upon the surface of stone these diagonal cutting-edges operate at first to some extent, but with diminishing effect as the cut they make deepens, and the sides of the cutting-threads come to bear on the adjacent material, resulting in a greater frictional surface in contact, and greater resistance than if the cylinder were plain. Such cutters make straight grooves, as many as there are cutting-edges, and once having penetrated their depth, lateral motion of the tool or stone for the purpose of traversing the whole surface is practically impossible.

Cylindrical or roller cutters have been used, as shown in the Letters Patent of James Bidwell, No. 38,782, wherein the disk-cutters, arranged on a shaft, have a zigzag or corrugated form upon the edge. Such cutters do not necessarily traverse the whole surface to be worked, and in such a manner as to cut and remove the whole surface to an even depth, but seem to operate more like a single-pointed pick, and receive myriad blows, to produce any valuable effect in removing an entire surface to any given depth.

My cutter is secured either in a handle or in a machine as a tool, so as to have a rolling motion around its own axis. It may be perforated for a pin or shaft, or have projecting fixed trunnions or bearings. It should roll like a wheel on the surface to be cut without sliding or frictional motion thereon to perform its best work.

The stone may be stationary, and the tool may move over its surface, or the stone may move under the stationary tool, the roller-cutter revolving thereon; or the tool may be secured in the face of a revolving cylinder, the axis of which is parallel to the general stone-surface, and be thereby revolved, so as to strike and cut at each revolution while bearing on the stone. In either case the grooves cut by the screw-thread cutting-edges will tend to run off to right or left, according to the kind of screw-thread used, right or left hand, and at an angle to the general path of the tool proportioned to the pitch of the screw-thread, as shown in Figs. 1 and 2. Supposing the cutter to be operating upon the periphery of an emery-wheel or grindstone, at each return of the stone to the stationary cutter at a given place, the screw-thread cutters invariably and necessarily all attack different spots or lines on the stone or wheel from those operated upon at the previous revolution.

Hence, it only becomes necessary to repeat the revolutions to cause the whole surface operated on to be cut over.

It is evident that when an impression has been made by the screw-thread cutters upon a given surface the grooves therein will run off to right or left in harmony with the cutters from the general line of the cutter-path, and thereby approximate the condition and relations of grooves to cutters, where the cutters are disposed in rings around the cutter-roller and its axis. I find that if such cut is first made with a right-hand screw-thread cutter, and I subsequently pass, or cause to pass, a left-hand screw-thread cutter over the same surface, it runs at an angle proportioned to its pitch across the grooves previously made, as shown in Fig. 3, and cannot settle into the same, but cuts with increased speed and vigor until it has in turn made grooves deflecting in an opposite direction—say, at a corresponding angle—when the cutting is found to be done in turn with a slightly-diminished vivacity. Now, then, by alternately repeating these cuts, one upon the other, from right to left, or vice versa, I am able to remove the surface of the hardest emery-wheel, grindstone, granite, or any other similar material, by means of such a cutter or cutters composed of steel and of comparatively soft metal.

Unlike the cutting-action of the diamond or of a stationary chisel, which is largely the result of the friction of a harder body, the friction in my cutters is reduced to almost nothing, and resembles in its character that present where a vertical blow, or approximately vertical, is struck with a pick or chisel; and the cutter may be considered as a revolving chisel-cutter, acting by a direct and more or less vertical pressure on the stone, and may be used at very high speed without injury.

Emery-wheels and grindstones need not be slackened in speed while being operated on, and yet softer cutters than themselves will face the same.

I find it a convenient arrangement of the cutters, in order to obtain the right and left hand cutting action referred to, to secure a cutter of each kind, right and left hand screw-thread, and of the same dimensions, upon a single pin or shaft, the threads diverging from the center, and each revolving independently of the other, in pairs, which may be duplicated in line to any required extent.

For plane surfaces, or where the action is in a direct line, the same method may be adopted; or one line of such cutters may be disposed behind another, each line of cutters being so placed right behind left-hand screw-thread, and vice versa, as to continually cross the cutting and the grooves; or one line may be made to consist entirely of one thread and the succeeding line of the reverse. Both of these methods may be duplicated to any extent required; or a second set of grooves may be cut diagonally across the screw-threads of the roller-cutters, as shown in Fig. 6; but in all cases the cutters and the line and method of their action should be diagonal, and so disposed as to operate over the whole surface worked. The screw-threads are a continuous diagonal to the roller-axis. I contemplate the use of diagonal cutters not continuous, and not continuous screw-threads, but diagonal only, and of any varying pitch.

If the cutters are attached to arms, or to a plate revolving over the surface operated upon in a horizontal plane, attention must be given to the greater diameters and circumferences from the center outward. A single cutter from center to circumference would be subject to considerable friction, which may be avoided to a sufficient extent for practical purposes by cutting it in sections. Thus, in a variety of ways, the principle of a diagonal or a screw-thread cutter may be applied so as first to remove the surface by the paring action of the thread-cutters upon the edges of the previous cuts, the screw-threads or diagonal cutters being all of one kind—to wit, either right or left hand threads; or so as, second, to increase the vigor and speed of the cutting by alternating right and left hand diagonal or screw-thread cutting at will over the surface being cut. This alternation may be effected in a variety of ways, as by arranging right and left hand screw-thread or diagonal cutters in pairs on the same line, and reversing them alternately—say, by hand, or by duplicating or further increasing the same in reverse on different lines, one behind the other, for right-line or rotary action; or by arranging right and left hand screw-thread or diagonal cutters, each kind in same line, and alternately to any required extent.

I claim as my invention—

1. The improvement in the art of cutting emery-wheels, grindstones, granite, sandstone, marble, slate, and other like material, natural and artificial, by screw-thread cutters.

2. The improvement in the art of cutting emery-wheels, grindstones, marble, slate, and other like material, natural and artificial, by screw-thread cutters made to crosscut, as by right and left hand screw-thread cutters passing alternately over the same surface.

3. A roller-cutter for facing stone, provided with a screw-thread cutting-surface on its circumference.

4. A roller-cutter for facing stone, provided with a right-hand screw-thread cutting-surface, in combination with a roller-cutter provided with a left-hand screw-thread cutting-surface.

5. A cutter for operating upon the surface of stone or other like material, provided with rollers the cutting devices of which are located diagonally to each other, and so fixed as to compel the path of the cuts of one diagonal to cross those of the other diagonal in the same course, and by repetition plane the surface traversed.

6. The improvement in the art of cutting stone and other like substances by roller-cutters, the cutting devices of which are located diagonally to each other, and so as to cross-cut, one over the path of the other in the same course, and by repetition plane the entire surface traversed.

THERON A. RICHARDS.

Witnesses:
 WILLIAM HAAS,
 WILLIAM L. MILLER.